(12) United States Patent  
Elsworthy (10) Patent No.: US 7,373,710 B2
(45) Date of Patent: May 20, 2008

(54) TOOLBOX APPARATUS TO WHICH POWER TOOLS MAY BE MOUNTED TO PROVIDE A WORKSTATION

(75) Inventor: Christopher Thomas Elsworthy, Bristol (GB)

(73) Assignee: C Enterprise (HK) Limited, Kowloon, Hong Kong Sar (CN)

( * ) Notice: Subject to any disclaimer, the term of this patent is extended or adjusted under 35 U.S.C. 154(b) by 13 days.

(21) Appl. No.: 11/543,104

(22) Filed: Oct. 5, 2006

(65) Prior Publication Data
US 2008/0083106 A1 Apr. 10, 2008

(51) Int. Cl.
*B23P 23/00* (2006.01)
(52) U.S. Cl. ............... 29/560; 29/26 B; 29/26 A; 144/285; 144/286.5; 144/35.2; 408/26
(58) Field of Classification Search ............ 29/26 B, 29/26 A, 26 R, 560; 408/24–26; 144/285, 144/286.1, 286.5, 35.2, 35.1; 312/244, 902, 312/284, 293.1, 293.2, 321.5; 83/477.2
See application file for complete search history.

(56) References Cited
U.S. PATENT DOCUMENTS 2,759,507 A * 8/1956 Davis et al. ............... 144/285
2,786,500 A * 3/1957 Unterfranz ................. 144/285
3,556,623 A * 1/1971 Damijonaitis ............. 312/244
4,265,283 A * 5/1981 Nash et al. ............. 144/286.1
4,405,003 A 9/1983 Watson et al.
4,483,573 A * 11/1984 Keller ..................... 144/286.1
6,322,297 B1 * 11/2001 Lupton ....................... 29/26 A

* cited by examiner

*Primary Examiner*—Erica Cadugan
(74) *Attorney, Agent, or Firm*—Leydig, Voit & Mayer, Ltd.

(57) ABSTRACT

A portable toolbox has a compartment closed by a lid, the lid being configured to mount a powered saw module to an inner face thereof such that the saw blade extends from an outer side of the lid which provides a flat sawbench. The toolbox is used with powered hand tools of the type having a power handle module incorporating rechargeable batteries and control switch for engaging a variety of multi-purpose tools having respective electric motors. A battery station receives the power handle module and an associated circuit controls and supplies power to the saw. An adaptor fixture may be employed in one configuration to provide a drill press and in another to provide a saw fence. The adaptor fixture includes a sliding carriage for mounting a powered hand drill and jaws for clamping engagement with the toolbox when used as a fence.

12 Claims, 8 Drawing Sheets

TOOLBOX APPARATUS TO WHICH POWER TOOLS MAY BE MOUNTED TO PROVIDE A WORKSTATION

TECHNICAL FIELD

The present invention relates to a toolbox apparatus to which power tools may be mounted to provide a workstation, and particularly to systems having a fixture which can be mounted to the toolbox to provide a drill press to which a portable electric drill can be mounted.

BACKGROUND OF THE INVENTION

Combining a toolbox for organising and protecting hand tools for transport or storage, with a workstation on which work or tools may be mounted, provides a versatile system able to meet the varying needs of the home handyman and tradesman. It would be particularly advantageous however, to provide a toolbox apparatus to which a power hand drill may be mounted to provide a drill press having the functions of a conventional free-standing drill press, and to which a power cutting tool, such as a circular saw, may be mounted to provide the functions of a conventional table saw.

U.S. Pat. No. 4,405,003 describes a table to which a circular saw may be mounted, and having a drill press fixture mounted to the table to receive a power hand drill. A drawback with this apparatus however, is the lack of provision for organising and storing the tools, the drill press fixture or other accessories when they are not in use. Moreover, the fixture may only be used to provide a drill press as it possesses no features allowing it to provide any other function.

It is an object of the present invention to overcome or substantially ameliorate at least one of the above disadvantages or more generally to provide an improved combination toolbox and workstation.

DISCLOSURE OF THE INVENTION

According to one aspect of the present invention there is provided a portable toolbox apparatus to which a power drill and power cutting tool may be mounted to provide a workstation comprising:

a compartment having a base and walls defining an opening;

a lid for closing the opening;

an aperture in one of the walls;

a substantially planar work surface on an outer face of the lid;

a cutter-receiving aperture in the lid for receiving a cutter of the cutting tool when the cutting tool is mounted to an inside face of the lid;

an electrical circuit for controlling and supplying power to the cutting tool and to the drill;

an adaptor fixture, including:
  an elongate member configured to be received in the aperture and having first and second longitudinally opposing ends;
  a carriage fixed at the first end for reciprocating linear travel, the carriage having a coupling for releasable connection to the drill;
  a first moving jaw mounted for movement relative to the first end of the elongate member;
  a second jaw fixed at a second end of the elongate member;

whereby with the elongate member fixed in the aperture and a drill mounted to the carriage above the work surface the adaptor fixture provides a drill press and with the cutting tool mounted to an inside face of the lid and a cutter of the cutting tool projecting through the cutter-receiving aperture the adaptor fixture is held in clamping engagement with the toolbox between the first and second jaws such that the elongate member provides a guide fence supported on or above the work surface.

The invention thus provides a combination toolbox workstation which can be configured to provide a drill press as well as mounting another power hand cutting tool such as a saw, router, sander or the like. Preferably the adaptor fixture further comprises a mount pivotally connected to the elongate member, the carriage being mounted on the mount, and a detent for fixing the mount to the elongate member such that the linear travel of the carriage is generally aligned with the longitudinal axis of the elongate member.

Preferably the moving jaw is spring biased to an open position wherein it is released from the toolbox. The moving jaw is preferably pivotally connected to the mount and has a face for engaging the carriage to move the jaw from its open position to a closed position for clamping to the toolbox.

A handle is preferably releasably connectable to the adaptor fixture for actuating linear sliding movement of the carriage.

Preferably a pair of substantially parallel channels are provided adjacent opposing edges of the work surface, the first and second jaws each including a protruding lug adapted to be received in a respective one of the channels.

The handle is preferably connected by first and second pins to the carriage and mount respectively, the first pin forming a pivot and the second pin being received in a slot to form a slider.

Preferably an adaptor-fixture-receiving portion of the toolbox is provided on the outside of the toolbox for receiving the adaptor fixture, the adaptor-fixture-receiving portion including fasteners for releasably fixing the adaptor fixture in place.

Preferably an elongate cutter-receiving aperture is provided in the lid for receiving a blade of a circular saw mounted to an inside face of the lid and a pair of guide grooves are formed either side of and parallel to the cutter-receiving aperture for receiving a sliding crosscut guide.

Cases may be removably mounted to the outer walls of the sides for holding accessories.

This invention provides a toolbox apparatus which is effective and efficient in operational use, and which provides the versatility of a workstation. The device has an overall simple design and a multi-purpose adaptor fixture which minimizes manufacturing costs while maximising performance.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
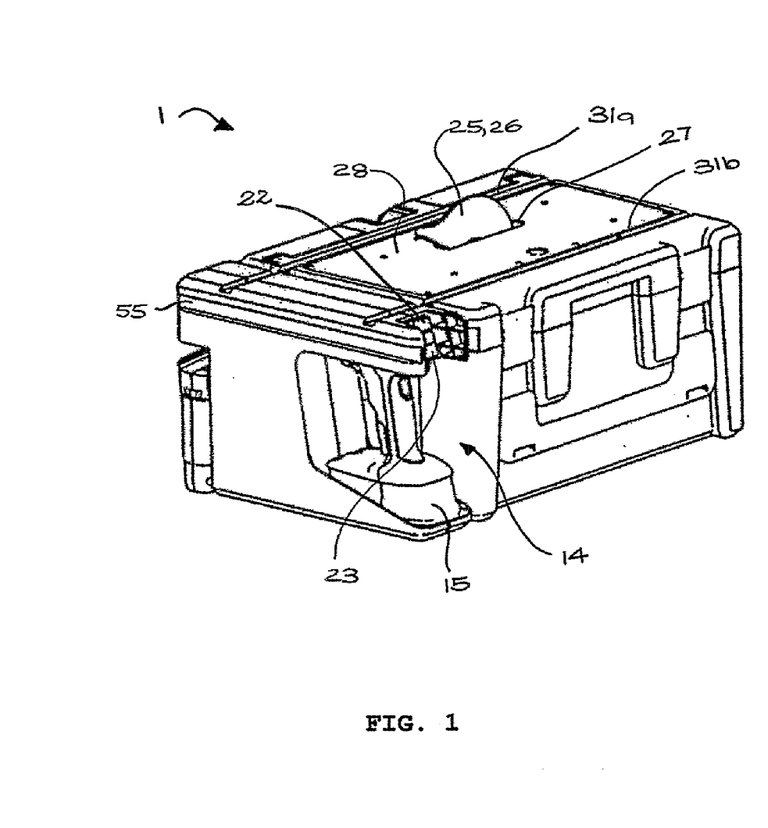
FIG. 1 is a pictorial view from the front of an embodiment of the toolbox apparatus of the present invention in a closed configuration.
Figure 2:
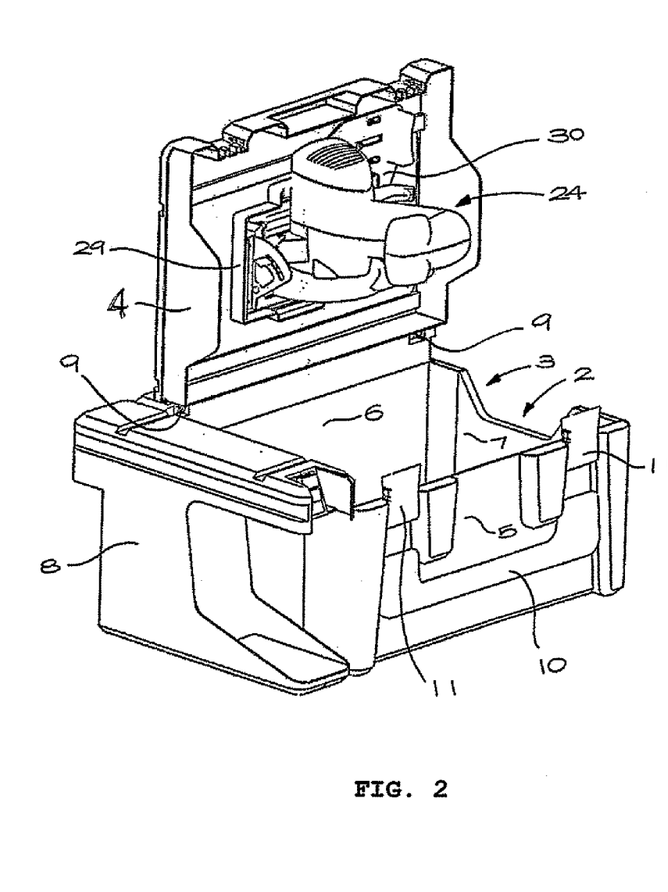
FIG. 2 is a pictorial view the toolbox apparatus of FIG. 1 in an open configuration.

FIG. 1 and FIG. 2 show an embodiment of the toolbox apparatus 1 of the present invention in a closed and open configuration respectively. The toolbox may be any shape, but preferably has the outline of a rectangular prism and is preferably of molded polymer construction. The toolbox 1 includes a main compartment 2 with a generally upwardly facing opening 3 with a lid 4 for closing the opening 3. The main compartment 2 is desirably defined by a base and four upstanding walls. The walls preferably include two opposed side walls 5 and 6 and two opposed end walls 7 and 8. The lid 4 is fixed along one of the side walls 6 by hinges 9. A handle 10 is attached, at approximately the center portion of the side wall 5. In order to carry the toolbox 1 by the handle 10, the lid 4 is secured in the closed position by latching mechanisms 11. Rubber feet (not shown) are fixed to the bottom of the base 4 for ensuring a firm and stable mounting. A tray (not shown) is received in the main compartment 2 for supporting tools and allowing them to be removed readily.

Figure 3A:
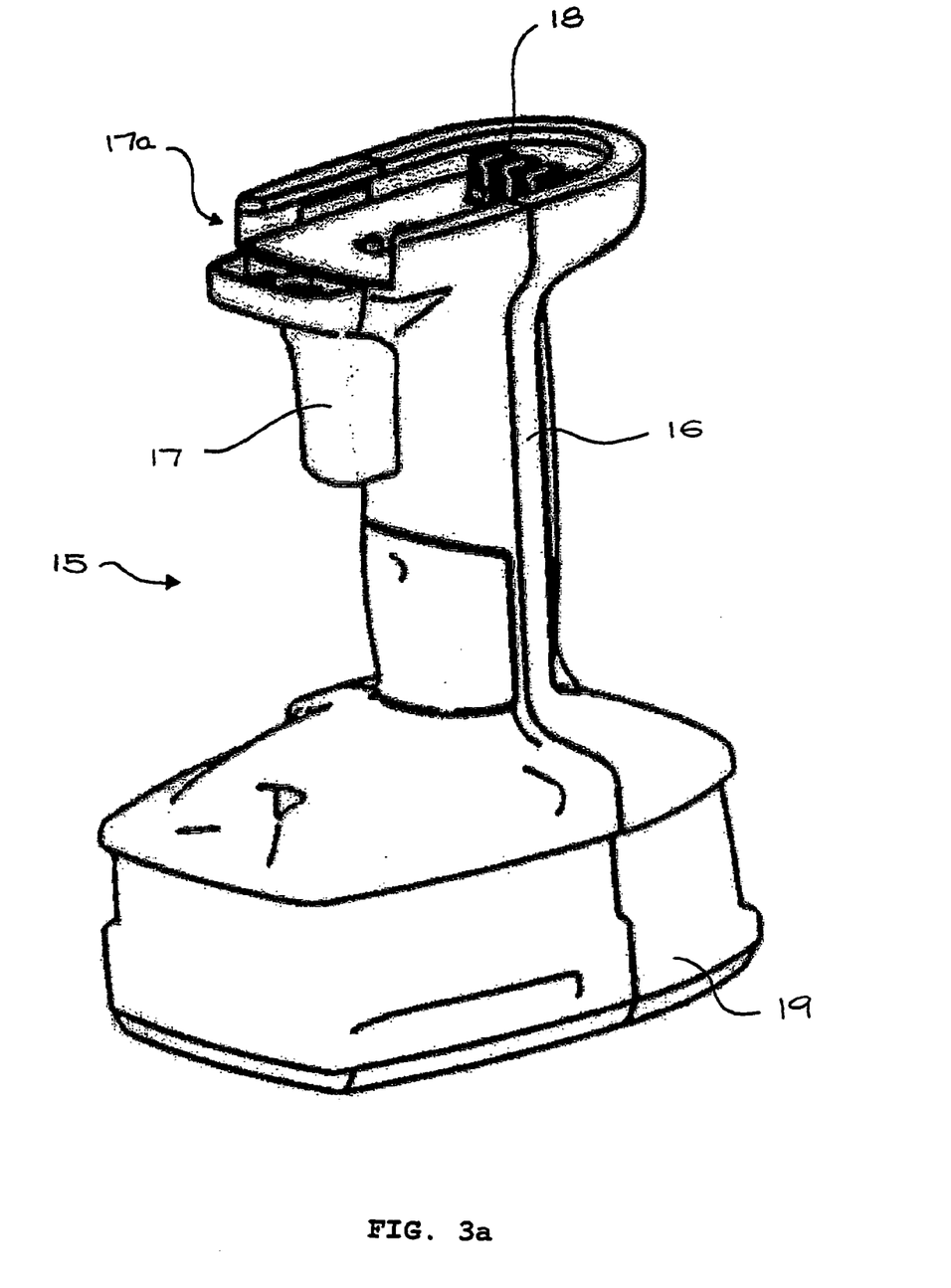
FIG. 3a is a pictorial view of a power handle module of the toolbox apparatus of FIG. 1.

A battery station 14 adjacent the end wall 8 is shown in FIG. 1 with a power handle module 15 mounted therein for charging. The power handle module 15 (shown separately in FIG. 3a) includes an elongate portion configured to provide a hand grip 16, a trigger 17 for use by a user having his hand in place on the hand grip, a female connector 17a provided with a plurality of exposed electrical contacts 18, and a battery pack 19 holding rechargeable batteries.

Figure 3B:
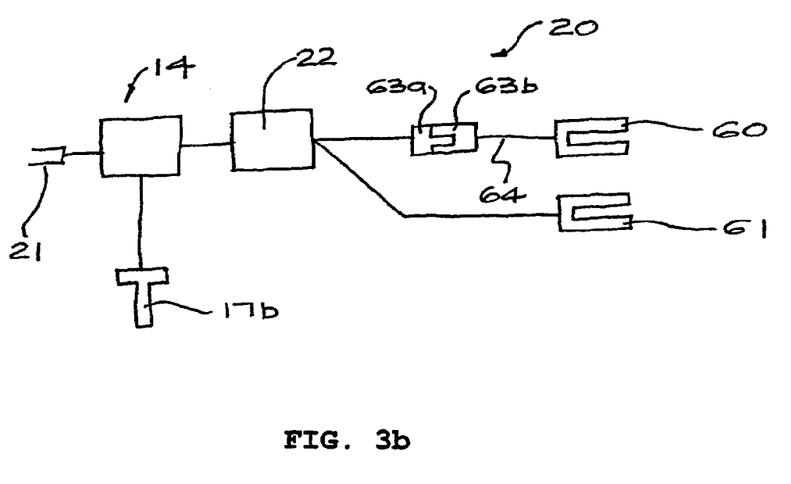
FIG. 3b is a view of an electrical circuit according to the present invention.

As seen in FIG. 3b, an electrical circuit 20 includes the station 14 having a coupler 21. The coupler 21 can be connected to mains supply electricity for powering the saw 24 and drill 40 (described in detail below). With the connector 17b of the power handle module 15 connected to the connector 17b, the station 14 also charges the batteries of the power handle module 15. Switch block 22 controls the supply of power from the station 14 to female connectors 60, 61. A plug 63a and socket 63b is provided between the switch block 22 and female connector 60, the sockets 63b and 60 being joined by cable 64.

The saw 24 is mounted to an inside face of the lid 4 and in the illustrated embodiment is a circular saw having a blade 25 and guard 26 extending through an elongate blade-receiving aperture 27 in the lid 4 to project above a substantially planar work surface 28 on an outer face of the lid 4. Mounted in this manner all the usual adjustments of depth and angle of cut are readily able to be made, simply by lifting the lid to access the saw 24. The inside face of the lid 3 includes a channel 29 for receiving a front part of the saw 24 and a sliding coupling 30 for releasably connecting the saw 24 to the lid 3. These same channel 29 and coupling 30 may also mount other power cutting tools such as a jigsaw, router, or the like. A pair of guide grooves 31a, 31b are formed either side of and parallel to the blade-receiving aperture 27 for receiving a sliding crosscut guide (not shown) for use with the saw 24. The saw 24 includes a male electrical connector (not shown) for connection to the female connector 60 of the circuit 20.

Figure 4A:
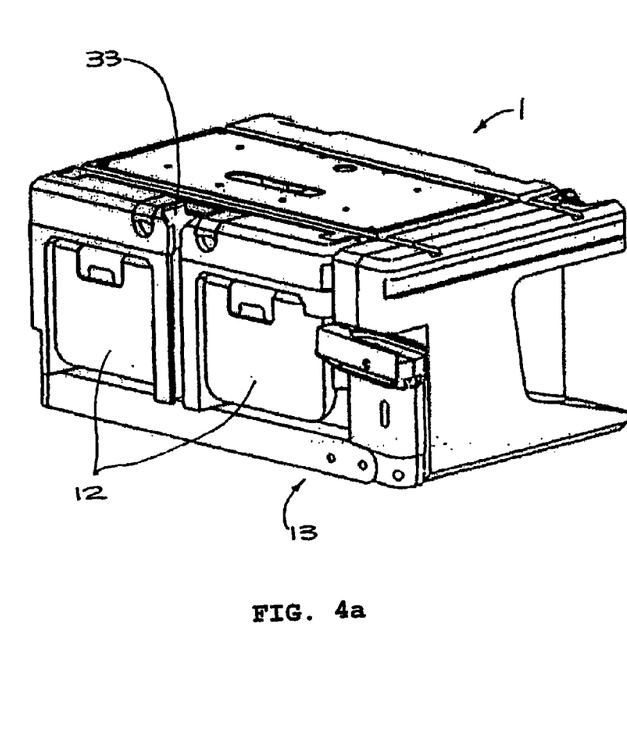
FIGS. 4a and 4b are pictorial views from the rear of the toolbox apparatus of FIG. 1 showing an adaptor fixture in a stored position and showing an adaptor-fixture receiving portion respectively.
Figure 4B:
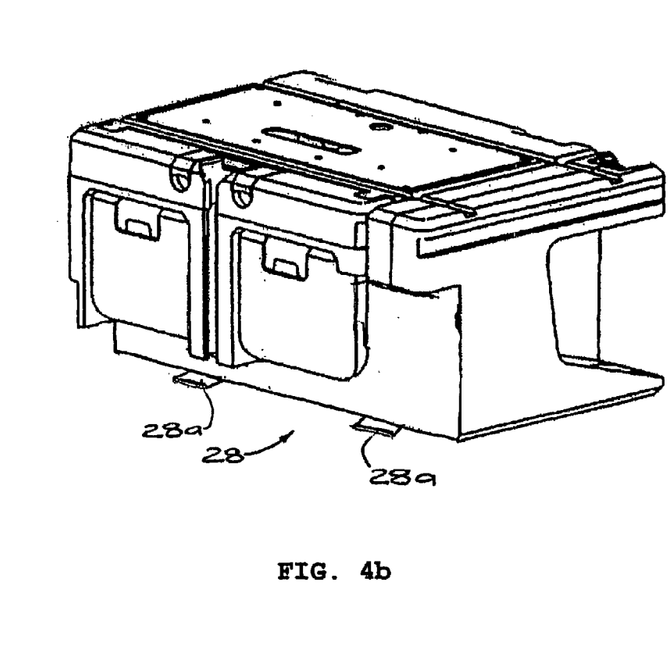
Figure 5A:
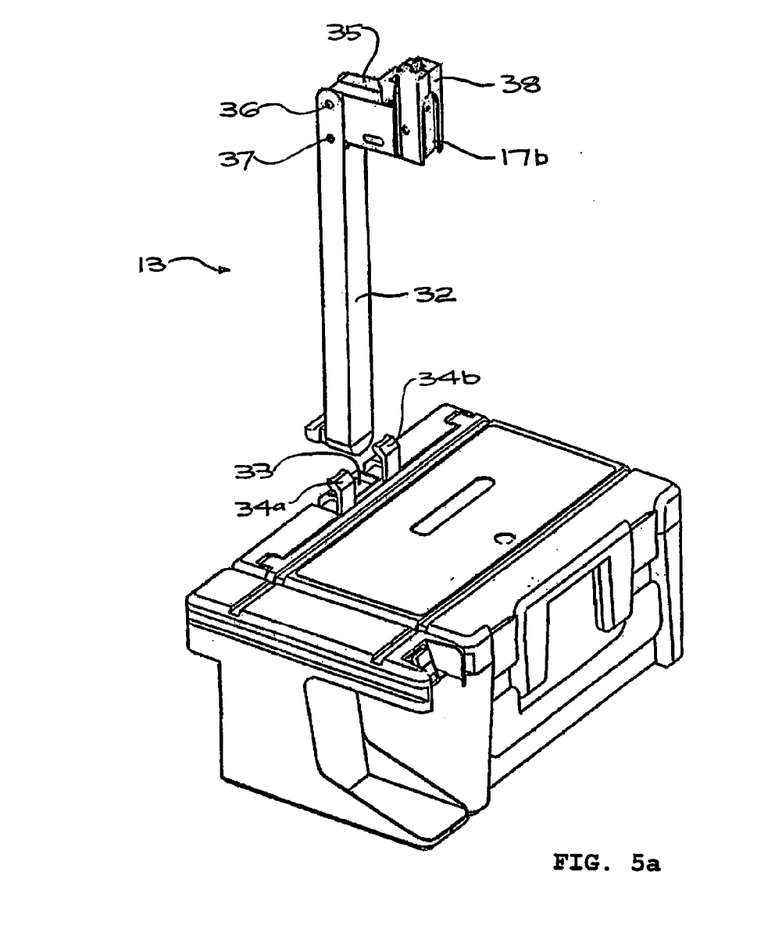
FIGS. 5a and 5b are pictorial views of the toolbox apparatus of FIG. 1 showing the mounting of the adaptor fixture for use as a drill press.
Figure 5B:
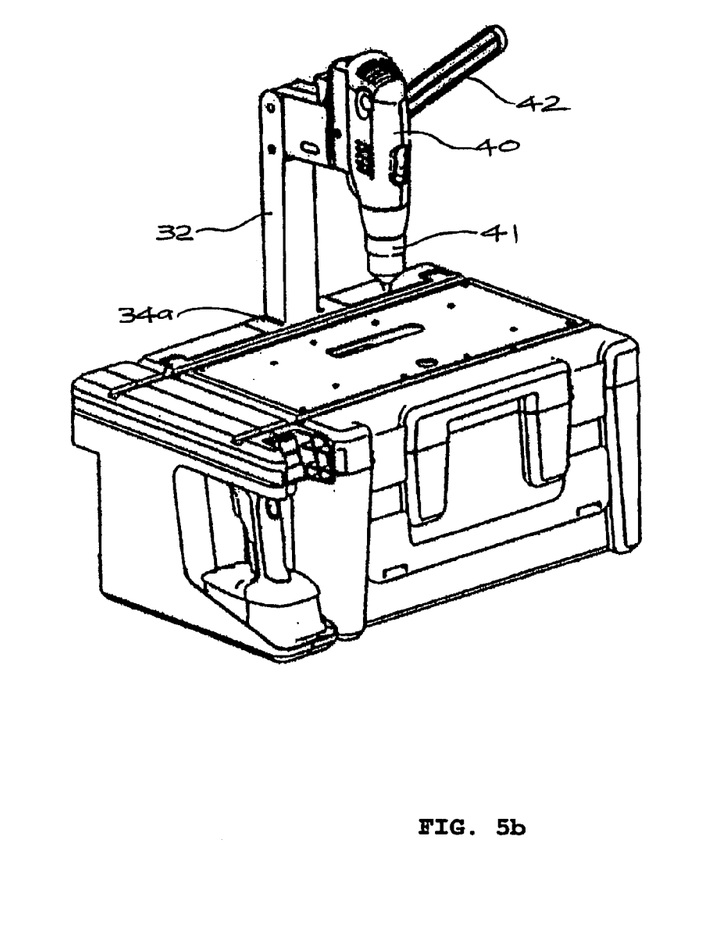

FIGS. 4a and 4b illustrate two accessory cases 12 and an adaptor fixture 13 which are removably attached to the outer section of the side wall 6. An adaptor-fixture-receiving portion 28 is generally L-shaped for receiving and storing the adaptor fixture 13 in an L-shaped configuration within the prismatic outline of the toolbox 1. The adaptor-fixture-receiving portion 28 may include clips 28a or like fasteners for fixing the adaptor fixture to the outside of the toolbox 1. The adaptor fixture 13 increases the versatility of the toolbox 1 and depending upon the intended use can be employed as either a drill press or a saw fence. The adaptor fixture 13 will be described in greater detail below.

Referring to FIGS. 5a, 5b and 6a-6d, the adaptor fixture 13 includes an elongate member 32 configured to be received in an upwardly extending aperture 33 in the wall 6. A pair of clamp levers 34a, 34b (shown released in FIG. 5a and engaged in FIG. 5b) are mounted to protrude into the aperture 33 to engage the elongate member 32, allowing the adaptor fixture 13 to be clamped in position at a variable height. The socket 63b, cable 64 and female connector 60 are fixed to the adaptor fixture 13 for supplying power to the drill 40.

A mount 35 is connected to a first end of the elongate member 32 by a pivot 36 and a detent 37 (such as a spring-loaded ball engaging a recess). A carriage 38 is mounted on the mount 35 for reciprocating linear travel relative thereto. The carriage 38 includes a second connector 17b (of like construction to the first connector 17a on the power handle module 15) for connection to a drill 40 having a motor-driven chuck 41.

The linear travel of the carriage is generally parallel to the long axis of the elongate member, the adaptor fixture 13 including a spring 60 for biasing the carriage to an upper end of its linear travel, wherefrom it is manually displaced by use of the handle 42.

Figure 6A:
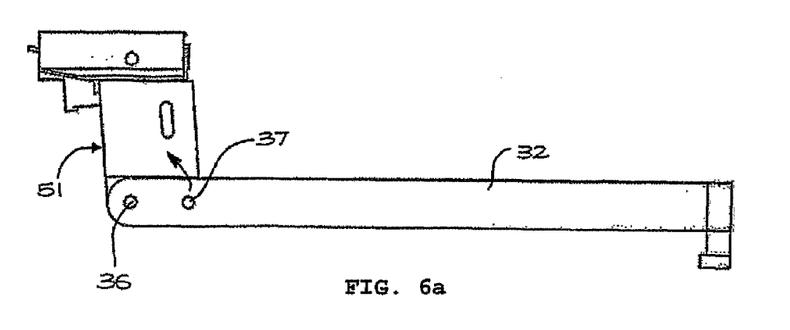
FIGS. 6a and 6b are side elevations of the adaptor fixture configured for use as a drill press and saw fence respectively.
Figure 6B:
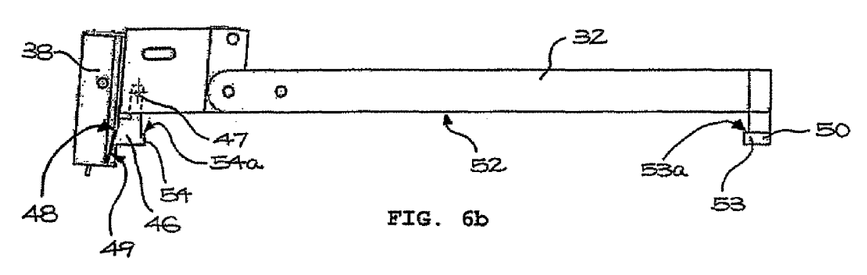
Figure 6C:
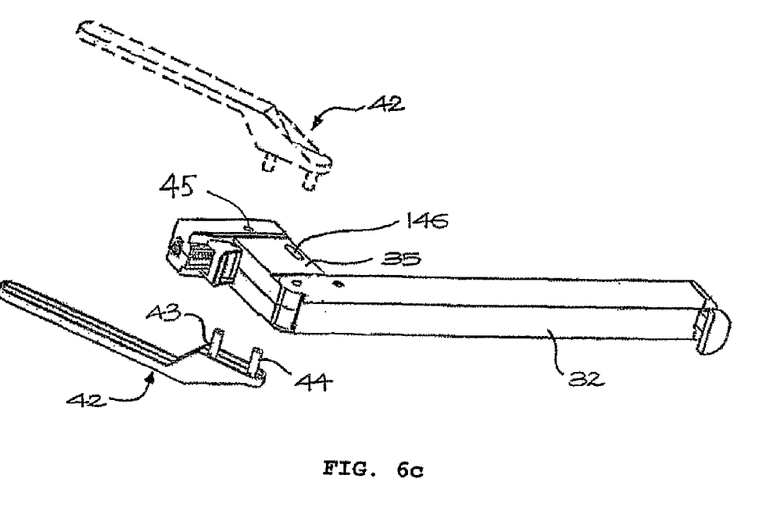
FIG. 6c is a pictorial view of the adaptor fixture of FIGS. 6a and 6b.

As seen in FIG. 6c, the handle 42 includes first and second cylindrical and parallel pins 43, 44. A through-extending aperture 45 is provided in the carriage 38 and a through-extending slot 146 is formed in the mount 35. The first pin 43 is received in the aperture 45 forming a pivot and the second pin 44 is received in the slot 146 to form a slider. The handle 42 can be mounted to either side of the adaptor fixture 13 for left- or right-handed operation.

Figure 6D:
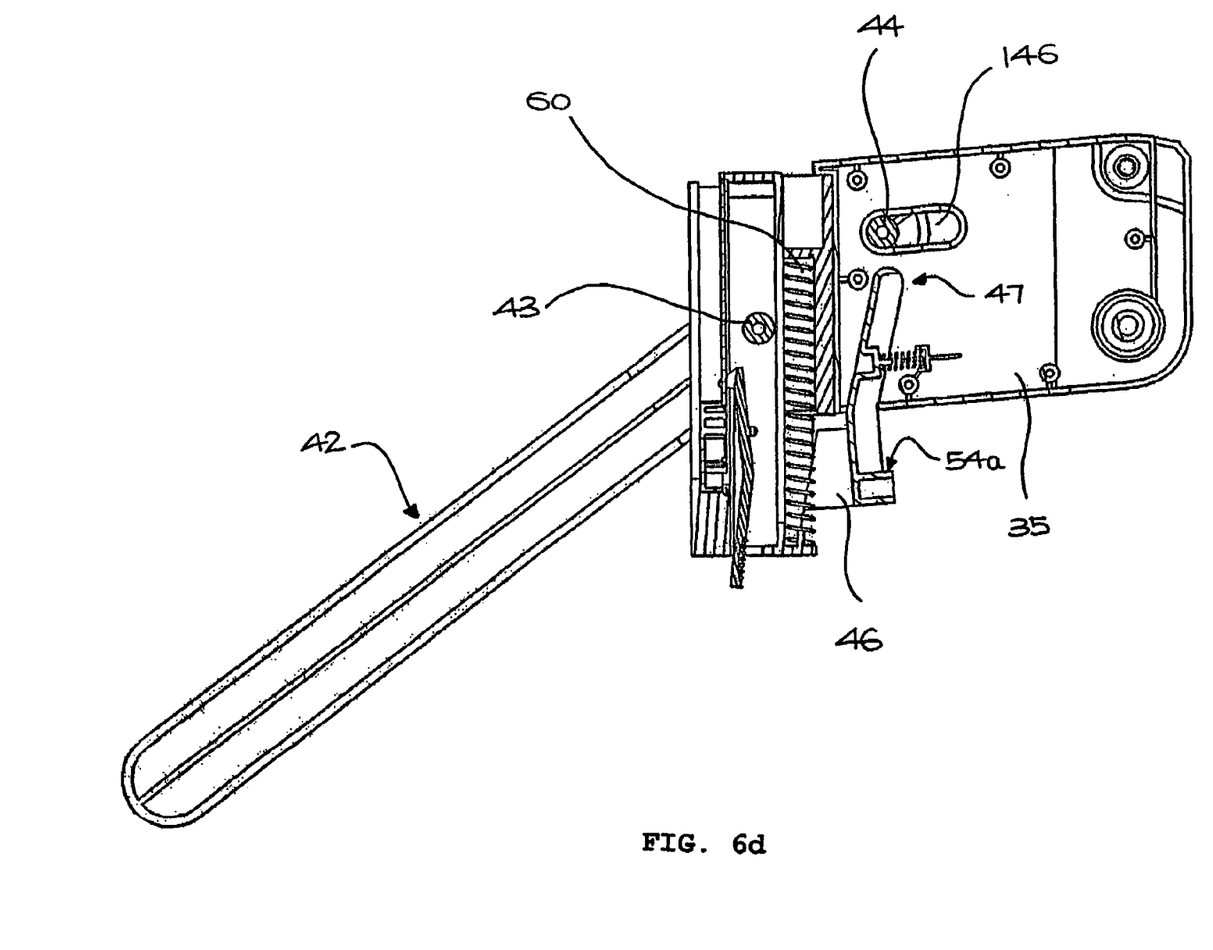
FIG. 6d is a longitudinal section through the adaptor fixture of FIGS. 6a and 6b, and FIGS. 7a and 7b are end elevations of the toolbox apparatus showing two consecutive steps in mounting the adaptor fixture for use as a saw fence.

A first jaw 46 is attached by a transversely extending pivot 47 to the mount 35. The jaw has a face 48 held against the inclined face 49 of the carriage 38 by a torsion spring (not shown) such that actuated by the handle 42 to move the carriage 38 the jaw 46 is pivoted. A second jaw 50 is fixed at second end of the elongate member 32 and includes an inwardly protruding lug 53 having a bearing surface 53a, while the moving jaw 46 includes a corresponding lug 54 with a bearing surface 54a.

To convert the adaptor fixture 13 from use as a drill press (FIG. 6a) to use as a fence (FIG. 6b) the mount 35 is rotated about pivot 36 such that surface 51 is aligned with the inner face 52 of the elongate member 32.

Figure 7A:
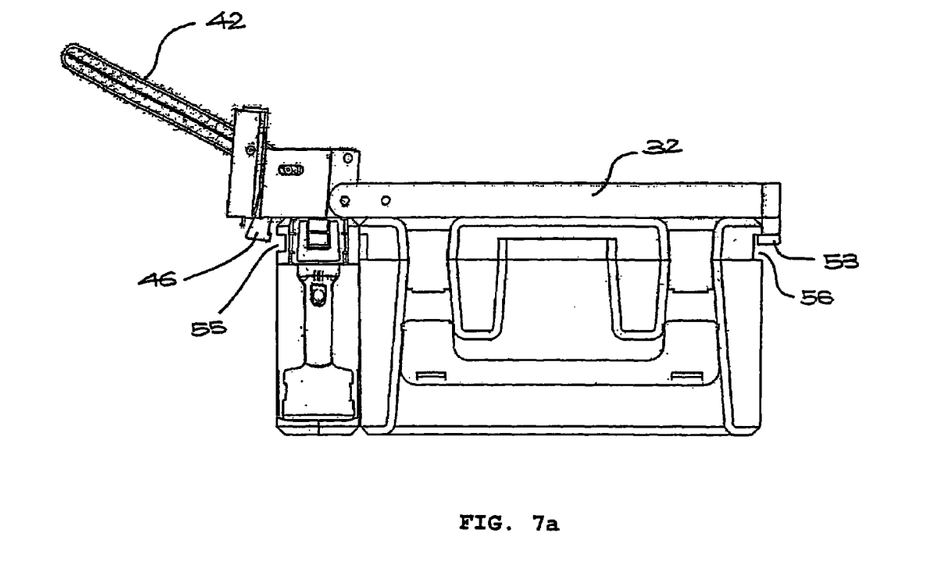
Figure 7B:
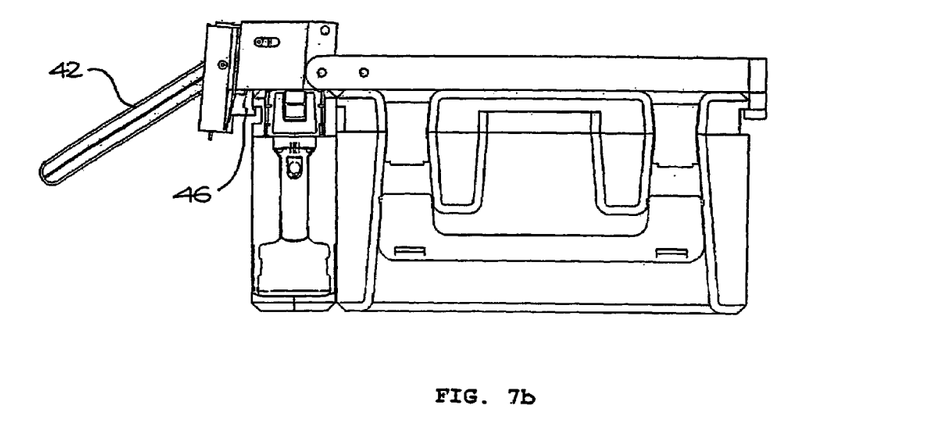

Referring to FIGS. 7a and 7b, a pair of substantially parallel channels 55, 56 is provided in the sides 7, 8 adjacent opposing edges of the work surface 28. As shown in FIG. 7a, to clamp the adaptor fixture 13 to the toolbox 1 the lug 53 is first hooked into the channel 56. The carriage 38 is biased upward and the jaw 46 biased outward of the toolbox to its open position, allowing the inner face 52 of the elongate member to rest upon the work surface 28. When correctly positioned, by pivoting the handle 42 downward the carriage 38 is moved downward, the surfaces 48, 49 cooperating to pivot the jaw 46, thereby holding the adaptor fixture 13 in clamping engagement with the toolbox between the jaws 46, 50. In this position the elongate member 32 provides a saw fence supported on the work surface 28.

Aspects of the present invention have been described by way of example only and it should be appreciated that modifications and additions may be made thereto without departing from the scope thereof.

The invention claimed is:

1. A portable toolbox apparatus comprising:
   a compartment having a base and walls defining an opening;
   a lid for closing the opening;
   an aperture in one of the walls;
   a substantially planar work surface on an outer face of the lid;
   a cutter-receiving aperture in the lid for receiving a cutter of a cutting tool when the cutting tool is mounted to an inside face of the lid;
   an electrical circuit for controlling and supplying power to the cutting tool and to a drill; and
   an adaptor fixture, including:
      an elongate member configured to be received in the aperture and having first and second longitudinally opposing ends,
      a carriage fixed at the first end for reciprocating linear travel, the carriage having a coupling for releasable connection to the drill,
      a first jaw mounted for movement relative to the first end of the elongate member, and
      a second jaw fixed at a second end of the elongate member so that when the elongate member is fixed in the aperture and the drill is mounted to the carriage above the work surface, the adaptor fixture provides a drill press and when the cutting tool is mounted to an inside face of the lid and the cutter of the cutting tool projects through the cutter-receiving aperture, the adaptor fixture is held in clamping engagement with the toolbox between the first and second jaws such that the elongate member provides a guide fence supported on or above the work surface.

2. The toolbox apparatus of claim 1 wherein the adaptor fixture further comprises a mount pivotally connected to the elongate member, the carriage being mounted on the mount, and a detent for fixing the mount to the elongate member such that linear travel of the carriage is generally aligned with a longitudinal axis of the elongate member.

3. The toolbox apparatus of claim 1 wherein the first jaw is spring biased to an open position wherein the first jaw is released from the toolbox.

4. The toolbox apparatus of claim 2 wherein the first jaw is pivotally connected to the mount, and has a face for engaging the carriage, to move the first jaw from an open position to a closed position for clamping to the toolbox.

5. The toolbox apparatus of claim 1 further comprising a handle releasably connectable to the adaptor fixture for actuating linear sliding movement of the carriage.

6. The toolbox apparatus of claim 1 including a pair of substantially parallel channels located at adjacent opposing edges of the work surface, the first and second jaws each including a protruding lug adapted to be received in a respective one of the channels.

7. The toolbox apparatus of claim 5 wherein the handle is connected by first and second pins to the carriage and mount respectively, the first pin forming a pivot and the second pin being received in a slot to form a slider.

8. The toolbox apparatus of claim 1 including an adaptor-fixture-receiving portion of the toolbox located on an outer side of the toolbox for receiving the adaptor fixture, the adaptor-fixture-receiving portion including fasteners for releasably fixing the adaptor fixture in place.

9. The toolbox apparatus of claim 1 wherein the cutter-receiving aperture located in the lid is elongate for receiving a blade of a circular saw mounted to the inside face of the lid, and
   the toolbox apparatus includes a pair of guide grooves located on either side of and parallel to the cutter-receiving aperture for receiving a sliding crosscut guide.

10. The toolbox apparatus of claim 1 including cases removably mounted to an outer wall of the compartment for holding accessories.

11. The toolbox apparatus of claim 1 wherein the electrical circuit includes a station for receiving a rechargeable battery and a supply connection for supplying power to the station for charging the battery.

12. The toolbox apparatus of claim 1 wherein the adaptor fixture further comprises spring means for biasing the carriage to one end of the linear travel.

* * * * *